Dec. 26, 1939.　　　P. T. EVANS ET AL　　　2,184,796
BELTING
Filed Aug. 24, 1937　　　2 Sheets-Sheet 2
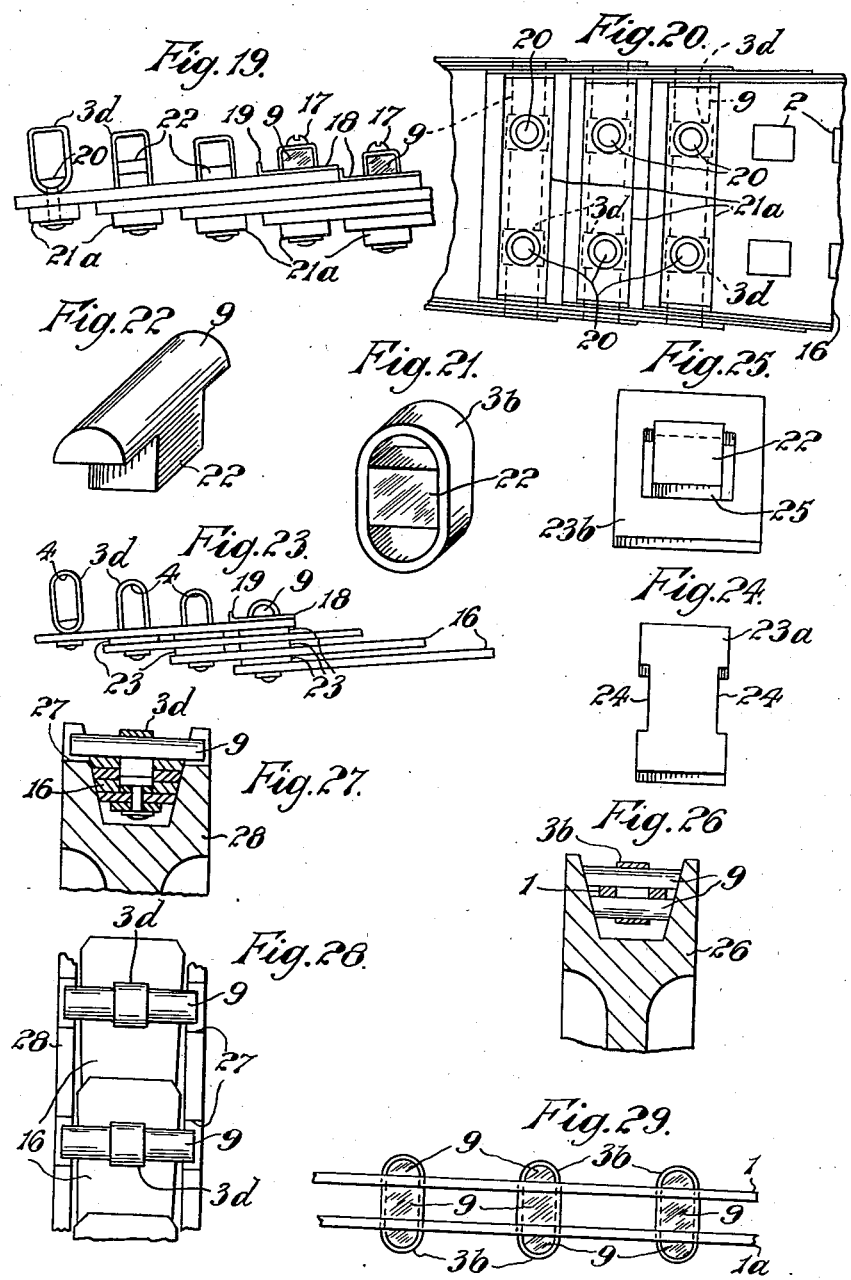

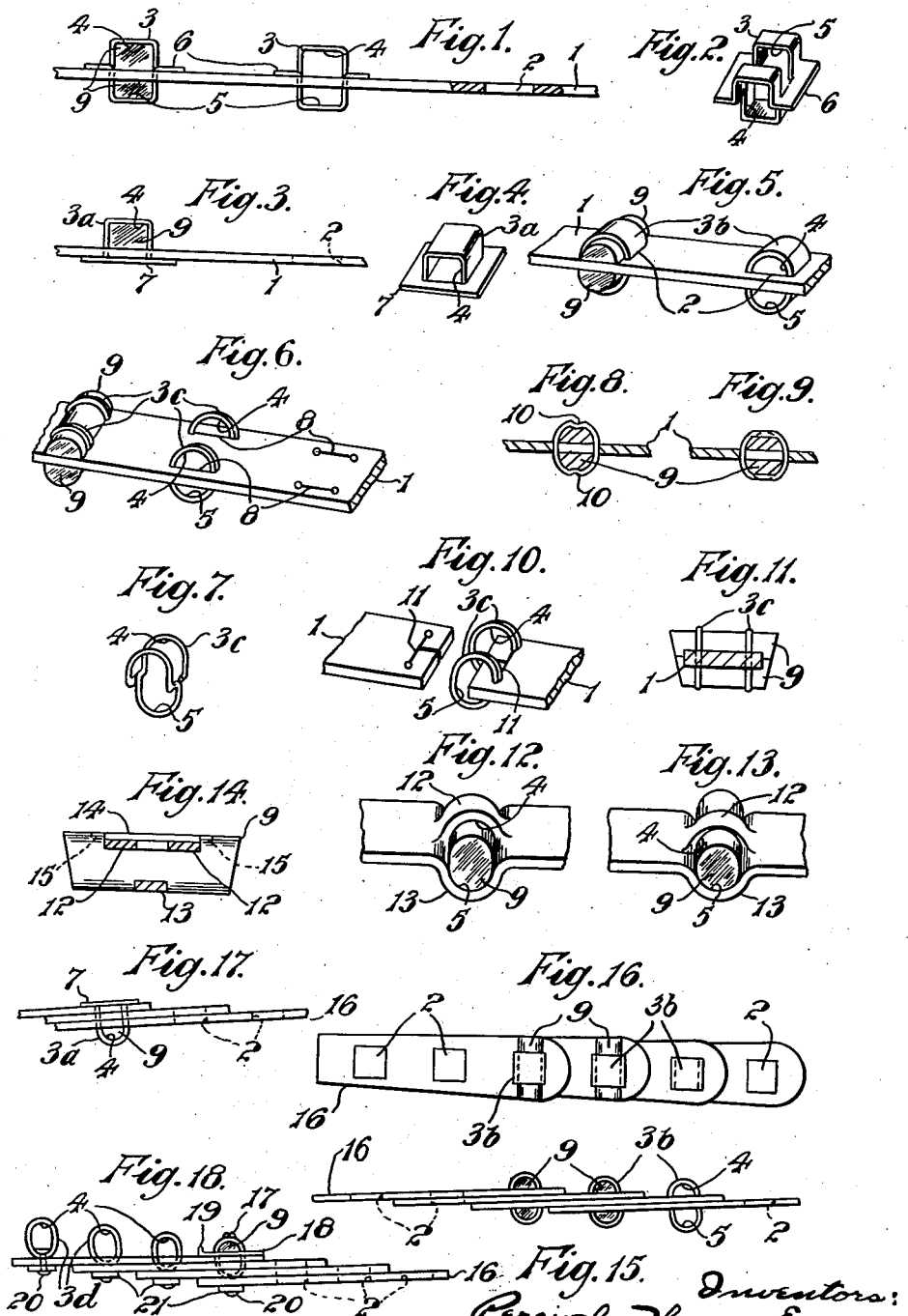

Patented Dec. 26, 1939

2,184,796

UNITED STATES PATENT OFFICE 2,184,796

BELTING

Percival Thomas Evans and John Herbert Wright, Coventry, and Harry Brammer, Leeds, England Application August 24, 1937, Serial No. 160,718
In Great Britain September 1, 1936

20 Claims. (Cl. 74—231)

This invention relates to belting of the kind employed for power transmission purposes and constructed of flexible material with transverse bars or like members arranged at intervals along its length.

Belting of this type in one of its forms comprises a long strip of flexible material with transverse leather or other bars secured on one or both of its faces by means, such as rivets or bolts. The bars when riveted, are difficult to remove for replacement, for example, when worn by contact with the sides of the grooves in pulleys.

The invention is also applicable to section built belting composed of short overlapping links of flexible material held together by fixed or detachable securing means.

According to this invention there is provided a flexible belt of the type including transverse bars, wherein loops are provided on one or both faces of the belt for the reception of the bars.

The invention embraces a flexible belt of the type including transverse bars, wherein clips for the bars are located at intervals in the length of the belt and are adapted to project on one or both of its faces so as to form loops for the reception of the bars.

The invention includes a flexible belt composed of superimposed links, wherein clips are passed through holes or slits in the superimposed links and present loops on one or both faces of the belt for the insertion of transverse bars, said bars and clips serving to hold one another in position.

The invention further embraces a construction wherein the transverse bars are passed through loops to extend beyond each side of the belting so as to contact with or enter the sides of grooved pulleys or have end pads for such purpose. The transverse bars may be secured in the clips by deforming the latter or by means passed through the clips and bars.

The term flexible material is intended to include leather, textile material and so-called "rubber textile material" or any like pliable, but substantially non-stretchable, material; the term transverse bar is intended to include pins, plugs, tubes or any similar member; the term clips is intended to include metal or other members of strip, wire, tubular or other convenient formation; the term loops is intended to include eyes, holes or openings capable of receiving the transverse bars.

Referring now to the accompanying drawings in which several embodiments of the invention are shown by way of example only—

Fig. 1 shows a side elevation of a continuous strip belt with one form of clip applied thereto;

Fig. 2 shows a perspective view of the type of clip used in Fig. 1;

Fig. 3 shows a side elevation of a continuous strip belt with a modified clip provided with a bed-plate for receiving one transverse bar;

Fig. 4 shows a perspective view of the clip used in Fig. 3;

Fig. 5 shows a perspective view of a continuous strip belt with a tubular type of clip applied thereto;

Fig. 6 is a perspective view of a continuous strip belt with wire clips inserted therein;

Fig. 7 is a perspective view of a modified wire clip provided with two loops at the top and one loop at the bottom;

Figs. 8 and 9 are sectional side elevations of two forms of deforming a clip to hold a transverse bar;

Fig. 10 is a perspective view of the joint in a continuous strip belt with a wire type of clip to secure the joint;

Fig. 11 is a sectional end view of a joint according to Fig. 10 but with the transverse bars recessed to embrace the belt;

Fig. 12 is a perspective view of a continuous strip belt adapted to form its own loops for the reception of a transverse bar;

Fig. 13 is a perspective view of a modification of Fig. 12 showing the transverse bar recessed to receive the loops of the belt;

Fig. 14 is a sectional end elevation of a construction according to Fig. 13 but with a securing plate for holding the loops in the recess of the transverse bar;

Figs. 15 and 16 are respectively a side elevation and a plan of a superimposed link type of belt with tubular type clips applied thereto;

Fig. 17 is a side elevation of a superimposed link type of belt showing a clip provided with a bed-plate passed therethrough;

Fig. 18 is a side elevation of a superimposed link type of belt with tubular type clips riveted to the links;

Figs. 19 and 20 are respectively a side elevation and a plan looking from below of a superimposed link type of belt with tubular type clips riveted thereto in pairs throughout the length of the belt;

Fig. 21 is a perspective view of a tubular type clip with a filler block inserted therein;

Fig. 22 is a perspective view of a transverse bar furnished with an integral filler block;

Fig. 23 is a side elevation of a superimposed link type of belt furnished with tubular clips riveted to the links and spacing washers between the links;

Fig. 24 is a perspective plan view of a modified form of spacing washer for the construction according to Fig. 23;

Fig. 25 is a perspective plan view of a further modified form of spacing washer with an integral filler block;

Fig. 26 is a sectional end view of a continuous strip type of belt with transverse bars extending beyond its sides and applied to a pulley;

Figs. 27 and 28 are respectively a sectional end elevation and a plan of a superimposed link type of belt with riveted tubular clips and upper transverse bars extending into recesses in a pulley rim;

Fig. 29 is a side elevation of a continuous strip type of belt of double formation furnished with tubular clips and spacing blocks between the strips.

In carrying out this invention for a belt as shown in Fig. 1 wherein the flexible material is in one continuous strip 1, holes 2 are formed therein at intervals. Detachable metal or other clips 3 are inserted into the holes 2 and project beyond each face of the strip in the form of loops 4, 5. Each clip 3 is cut from a strip of metal and provided with two or more longitudinal slits therein which allow portions of the clip to be pressed outward from two end flanges 6 in opposite directions. Each pressed out portion and pair of portions forms or form one of the aforesaid loops 4, 5, which are shown in, but may be out of, vertical alignment and are substantially rectangular, but may be semi-circular or other shape, in cross section.

The clip 3a in Figs. 3 and 4 is of strip metal with a pressed out portion forming the loop 4 upstanding from a bed-plate 7. This clip is passed through holes 2 in a strip 1 until its bed-plate 7 contacts with the face of the belt.

The modified clips 3b shown in Fig. 5 are cut from a tube or like element of suitable cross section. Clips so formed are without flanges and may be passed freely through the holes 2 in the strip 1 without restriction until the desired loops 4, 5, appear on each face of the belting.

In the modification shown in Fig. 6 the clips 3c are made of wire and passed through slits 8 in the belting to form loops 4, 5, on the upper and lower surfaces of the belting. In this construction, two clips 3c are arranged side by side at desired intervals in the belting but one, three or more clips may be arranged in the width of the belt. The wire clip 3c is modified in Fig. 7 to provide two loops 4 at the top and one loop 5 at the bottom.

When assembling the aforesaid belts, clips 3, 3a, 3b or 3c are passed through the holes 2 or slits 8 in the strip 1 until the loops 4, 5 (loop 4 only for clip 3a) project the required distance beyond the faces of the strip and bars 9 of wood, metal, leather, hard raw hide or the like material are inserted in each loop. Bars 9 may be secured by small nails or screws being inserted through the loop portions of clips 3, 3a, 3b, into the bars. Alternatively the clips 9 may be deformed by forcing indents 10 (Fig. 8) into the bars 9 or by pressing the clips into recesses in the bars, as shown in Fig. 9. The ends of the bars 9 may be straight, or inclined to form a V-belt.

If so desired the ends of a flexible strip 1 may be secured together as shown in Fig. 10 by means of a pair of the aforesaid clips 3c being inserted into T-shaped incisions 11 formed in the ends of the strip. The vertical portions of each clip are forced along the leg portion of each slit 11 until they enter the cross portion of each slit after which the transverse bars 9 are located in the loops 4, 5, of the clip (or clips). By the bars 9 pressing firmly on the faces of the strip 1 across the joint of the two ends, tension on the belt cannot deform the T-shaped slits 11 and break the joint.

Each of the coacting transverse bars 9 is recessed on its inner face in Fig. 11 so as to embrace the edges of the strip 1 and any of the bars in the length of a belt may be formed likewise. Alternatively only one of a pair of bars is recessed.

The clips in some cases instead of being detachable, form an integral feature of the flexible strip 1, as shown in Fig. 12. For this construction two slits—running lengthwise of the strip— are formed in transverse alignment at intervals in the belt so that portions 12 of the strip may be pressed up and other portions 13 down to form loops 4, 5, for the bars 9. This construction may be modified according to Fig. 13 by recessing the transverse bars 9 on their upper and lower surfaces for the reception of the loop portions 12, 13, of the strip. In Fig. 14 the upper (and/or lower) loop portion 12 is retained in its recess by means of a plate or like member 14 which incorporates integral or loose means for securing it in position. The simplest form is to pass a nail or screw through the plate and loop portion into the bar. Each plate 14 has projections 15 for entering recesses in the walls of the recess in the bar for positioning purposes but these may be omitted.

In a modification the belting is section built and composed of short overlapping links 16 of flexible material partially superimposed one upon the other with clips passing therethrough. The clips hold the short links together and by the insertion of the transverse bars 9 the several links are securely locked together. The number of holes (or slits) in each link is dependent upon the number of superimposed links forming the thickness of the belt.

The clips may be of any of the aforesaid forms.

In Figs. 15 and 16 three holes 2 are formed in each link 16, short tubular clips 3b are passed through a set of vertically aligned holes when the links are superimposed and bars 9 are passed through the loops 4, 5. Clips 3 or 3a may be used instead of clips 3b. If wire clips 3c are to be used then slits 8 will replace the holes 2.

In Fig. 17 a clip 3a is employed and passed down through the holes 2 in the superimposed links forming a belt until the bed-plate 7 contacts with the upper face of one of the said links. A bar 9 is then inserted in the projecting loop 4 and secured by a nail or other means.

A belt of superimposed links 16 may be further modified by securing the clips to the links by means of rivets, bolts or other means so as to project from one face thereof. For example, as shown in Fig. 18, a clip 3a is riveted to one end of each link 16 so that an upstanding loop 4 is furnished for passage through other links 16 which are superimposed upon the first link. For a belt having a thickness of four superimposed links three holes 2 are provided in each link in addition to, and in longitudinal alignment with, the clip 3d. When the links are assembled the upstanding clip of the lowest link passes up through the first hole (the one nearest the clip) of the next above link, the second hole of the link above that and finally through the third hole in the top link. The various superimposed links assume an inclined position in a belt so that continuing through a belt the aforesaid first or lowest link provides the first hole for the clip of the next (in the belt length) link, it also provides the second and third holes for the clips of the links continuing the length of the belt. A transverse bar 9 is passed through each loop 4 where it emerges from the superimposed links 16 and is secured by a screw 17.

To prevent wearing of the links 16 at the point where the bar 9 bears thereon, and also to increase such bearing surface, a raw hide or other washer 18 is passed over the end of each clip 3d before the insertion of the bar 9. The end 19 of each washer is turned up adjacent the end of a superimposed link of the belt. Further, the rivet 20 of each clip 3d has a leather or like washer 21 placed on its end prior to the rivet being riveted over the usual metal washer and the washer 21 may be recessed for the rivet washer and head to allow the belt to run over flat pulleys.

Figs. 19 and 20 show clips 3d arranged side by side for a comparatively wide belt. In this instance each pair of rivets 20 pass through a link 16 and a common bar 21a before being riveted over. The pairs of clips 3d pass up through the holes 2 in the links 16 for the washers 18 and bars 9 to be placed in position. Screws 17 secure the bars 9. If desired the bars 21a may be replaced by separate washers 21.

To prevent the clips being deformed by the tensile load upon the belt, the portions not filled by the bars 9 may be filled by blocks 22 of leather, raw hide, wood or the like and such blocks may comprise the pieces punched out of the links 16 when forming the holes 2.

In Fig. 21 a block 22 is applied to a clip 3b. If so desired blocks 22 may be provided on the inner faces of the bars 9, as shown in Fig. 22 for also holding the bars against endwise movement due to the location of the blocks in the holes in the links 16. To strengthen the clips they may be stiffened by means of pressed in ribs.

Moreover, in Fig. 23 to aid the flexing of a section built belt about a small pulley, washers 23 are placed upon the tubular clips 3a between the superposed links 16.

In Fig. 24 the washer 23a is adapted to be passed through the clips 3d and is held in position by the recesses 24 which receive the sides of the clips. In Fig. 25 the washer 23b forms part of the block 22 which hinges about its end 25.

Section built belting may be cut to any cross sectional shape before or after assembly. For a V-belt the links may taper in length with or without chamfered edges.

The bars 9 may be adapted to terminate flush with the sides of a belt, as shown in the majority of the before-named figures, or project therefrom, as in Figs. 11, 14 and 26, so as to bear against the grooves of a pulley 26 (Fig. 26) or to enter recesses 27 in the pulley 28 shown in Figs. 27 and 28 so that a positive drive is obtained. The latter figures show a superimposed V-link type of belt with clips 3d secured thereto. Also, renewable end pads may be secured on the ends of the transverse bars. Further, additional bars 9, blocks 22 or the washers may be associated with the belting. For example, bars 9 are located between a top and a bottom flexible strip 1, 1a with clips 3b passed through the parts to form loops 4, 5 on the outer faces of the strips and the bars 9 are recessed on both sides to receive the clips so as to be held in position. The transverse bars 9 are then placed in the loops. Blocks 22 or washers 23 may replace the centre bars 9.

We claim:

1. A flexible belt for transmitting power comprising means defining a flexible member having throughout the length thereof a plurality of longitudinally spaced openings extending from the upper to the lower face thereof, clips located in said openings and projecting from at least one face of said flexible member to form loops, and bars extending through said loops and transversely of the flexible member.

2. A flexible belt as claimed in claim 1, wherein said means defining the flexible member comprises a plurality of superposed links in partially overlapping relation.

3. A flexible belt as claimed in claim 1, wherein said means defining the flexible member comprises a flexible strip.

4. A drive mechanism for transmitting power comprising a flexible belt, clips secured to said belt at spaced points throughout its length and projecting from at least one face thereof, and bars extending through the clips transversely of said belt and projecting beyond at least one surface of said belt.

5. A drive mechanism as claimed in claim 4, wherein said bars and clips interlock with each other and said belt to secure the parts in assembled relation.

6. A drive mechanism as claimed in claim 4, wherein said belt comprises a plurality of link members in superposed relation, each link member having a number of openings therethrough for alining with openings in a superposed member; said clips passing through the alined openings of superposed members and the bar serving to retain the links and members in assembled relation.

7. A drive mechanism as claimed in claim 4, wherein said belt comprises a plurality of links in superposed and partially overlapping relation, each link having a number of openings therethrough for alining with openings in a superposed link; said clips passing through said alined openings and said bars serving to retain said clips and links in assembled relation.

8. A drive mechanism for transmitting power comprising a flexible belt having openings at intervals along its length, tubular members in said openings and projecting from at least one face of said belt to form loops, and bars extending through said tubular members and transversely of said belt.

9. A drive mechanism for transmitting power comprising a flexible belt having openings at intervals along its length, clips in said openings and projecting from at least one face of said belt to form loops, and bars extending through said clips and transversely of said belt, said clips being sheet metal stampings having a loop section and a flange section.

10. A drive mechanism for transmitting power comprising a flexible belt having openings at intervals along its length, clips in said openings and projecting from at least one face of said belt to form loops, and bars extending through said clips and transversely of said belt, said clips including a pair of laterally spaced loops at one face of the belt and a single loop at the opposite face thereof.

11. A drive mechanism for transmitting power comprising a flexible belt having openings at intervals along its length, clips in said openings and projecting from at least one face of said belt to form loops, and bars extending through said clips and transversely of said belt, said clips comprising members of bent wire.

12. In a flexible drive, a belt member and means forming opposed pairs of loops at opposite faces of and spaced longitudinally of said belt member, and bars extending through said loops and transversely of said belt member.

13. In a flexible drive, a flexible belt having openings spaced longitudinally thereof, tubular members in said openings and forming loops projecting from the belt, and bars extending through said loops and transversely of said belt.

14. In a flexible drive, the invention as claimed in claim 13, wherein said belt member comprises a plurality of superposed and partially overlapping links each having openings therethrough for alinement with openings in the superposed links, each tubular member being secured to the end of one link and projecting through an opening in a superposed link.

15. In a flexible drive, a flexible belt comprising a plurality of superposed and partially overlapping links each having openings spaced longitudinally thereof, the opening in superposed links being alined, and means securing the links to each other; said means including clips in said openings and projecting from the belt to form loops, and bars extending through said clips and transversely of the belt.

16. In a flexible drive, the invention as claimed in claim 15, wherein said securing means includes spacing washers between adjacent overlapping links and secured to the belt by said clips.

17. In a flexible drive, a flexible belt having openings spaced longitudinally thereof, clips in said openings and projecting from the belt to form loops, bars extending through said loop and transversely of the belt, and washers of hard wearing material between the belt and said transverse bars.

18. In a flexible drive, a belt comprising a plurality of superposed members having alined openings spaced longitudinally thereof, clips in said openings and projecting from a face of said belt to form loops, spacers between said belt members and retained by said clips, and bars extending through said loops and transversely of said belt.

19. In a flexible drive, a belt comprising a plurality of superposed and partially overlapped links having openings therethrough in alinement, spacer members between superposed links and having openings alined with the openings of said links, clips positioned in alined openings and projecting from a face of said belt to form loops, and bars extending through said loops and transversely of said belt.

20. The invention as claimed in claim 19, wherein each clip is secured to the inner end of a link.

PERCIVAL THOMAS EVANS.
JOHN HERBERT WRIGHT.
HARRY BRAMMER.